United States Patent
Takiguchi

(10) Patent No.: US 9,027,859 B2
(45) Date of Patent: May 12, 2015

(54) GAS FUEL INJECTION VALVE

(75) Inventor: Naoto Takiguchi, Miyagi (JP)

(73) Assignee: Keihin Corporation, Tokyo (JP)

( * ) Notice: Subject to any disclaimer, the term of this patent is extended or adjusted under 35 U.S.C. 154(b) by 3 days.

(21) Appl. No.: 13/823,124

(22) PCT Filed: Sep. 21, 2011

(86) PCT No.: PCT/JP2011/071453
§ 371 (c)(1),
(2), (4) Date: Jun. 11, 2013

(87) PCT Pub. No.: WO2012/046571
PCT Pub. Date: Apr. 12, 2012

(65) Prior Publication Data
US 2013/0299610 A1    Nov. 14, 2013

(30) Foreign Application Priority Data

Oct. 8, 2010  (JP) .................................. 2010-228268

(51) Int. Cl.
*F02M 51/00* (2006.01)
*F02M 61/04* (2006.01)
*F02M 21/02* (2006.01)

(52) U.S. Cl.
CPC .......... *F02M 61/04* (2013.01); *F02M 21/0254* (2013.01); *F02M 21/0266* (2013.01); *F02M 21/0275* (2013.01); *Y02T 10/32* (2013.01); *F02M 21/0212* (2013.01); *F02M 21/0215* (2013.01)

(58) Field of Classification Search
USPC .................................................... 239/585.1
See application file for complete search history.

(56) References Cited

U.S. PATENT DOCUMENTS

| 5,904,299 A | 5/1999 | Hans et al. |
| 6,213,413 B1 | 4/2001 | Kojima et al. |
| 7,464,886 B2 | 12/2008 | Landi |

(Continued)

FOREIGN PATENT DOCUMENTS

| CN | 1158153 A | 8/1997 |
| CN | 1908413 A | 2/2007 |

(Continued)

OTHER PUBLICATIONS

Official Communication dated Oct. 8, 2014 issued in the corresponding Chinese Patent Application 201180048520.4.

(Continued)

*Primary Examiner* — Len Tran
*Assistant Examiner* — Adam J Rogers
(74) *Attorney, Agent, or Firm* — Carrier Blackman & Associates, P.C.; William D. Blackman; Joseph P. Carrier

(57) ABSTRACT

A gas fuel injection valve is provided in which a circular recess is formed in a front end face of a valve plunger, the circular recess being surrounded by an annular land part, which is an outer peripheral part of the front end face, an inner peripheral face of the circular recess is formed in a tapered shape so as to increase in diameter in going from a base of the circular recess toward the annular land part, an annular lip is formed on a seating member, the annular lip being joined from the inner peripheral face through to the annular land part and being seated on a valve seat, and the annular lip is disposed so that an annular ridge line of an apex of the annular lip is positioned, in a projection in the axial direction of the valve plunger, above the inner peripheral face.

5 Claims, 4 Drawing Sheets

(56) References Cited

U.S. PATENT DOCUMENTS

| | | |
|---|---|---|
| 7,735,757 B2 | 6/2010 | Nakajima et al. |
| 2007/0029413 A1* | 2/2007 | Nakajima et al. .......... 239/585.5 |
| 2012/0018541 A1 | 1/2012 | Kuzuma et al. |

FOREIGN PATENT DOCUMENTS

| | | |
|---|---|---|
| CN | 2937519 Y | 8/2007 |
| EP | 1231378 A2 | 8/2002 |
| JP | 2000-087826 A | 3/2000 |
| JP | 2006-077777 A | 3/2006 |
| JP | 2006-188976 A | 7/2006 |
| JP | 2007-040205 A | 2/2007 |
| JP | 2007-040245 A | 2/2007 |
| JP | 2007-507645 A | 3/2007 |
| WO | 2010/113645 A1 | 10/2010 |

OTHER PUBLICATIONS

Official Communication (Decision Granting Patent) dated Sep. 3, 2014 issued in the corresponding JP Patent Application 2010-228268.

* cited by examiner

GAS FUEL INJECTION VALVE

CROSS-REFERENCE TO RELATED APPLICATIONS

The present application is the U.S. National Phase of PCT International Application PCT/JP2011/071453, filed Sep. 21, 2011, which, in turn, claimed priority based on Japanese patent application 2010-228268, filed Oct. 8, 2010. The subject matter of each of these priority documents, including specification, claims, and drawings, is incorporated by reference herein.

TECHNICAL FIELD

The present invention relates to a gas fuel injection valve that supplies to an internal combustion engine natural gas such as CNG or LPG as fuel and, in particular, relates to an improvement of a gas fuel injection valve that includes a valve body that has a nozzle member having a valve seat and a nozzle hole extending through a central part of the valve seat, a tubular valve housing formed from a magnetic material and connectedly provided at a rear end of the nozzle member, and a fixed core disposed rearwardly of the valve housing, a valve plunger that is slidably fitted to a sliding guide face on an inner periphery of the valve housing and has joined to a front end thereof a rubber seating member that is seated on the valve seat so as to close the nozzle hole, a return spring that is provided in a compressed state between the fixed core and the valve plunger and urges the valve plunger toward the valve seat side, and a coil that is disposed so as to surround the fixed core and, when energized, generates a magnetic force that attracts the valve plunger to the fixed core and separates the valve plunger from the valve seat.

BACKGROUND ART

Such a gas fuel injection valve is already known, as disclosed in Patent Document 1 below.

PRIOR ART DOCUMENTS

Patent Documents

Patent Document 1: Japanese Patent Application Laid-open No. 2007-40245

SUMMARY OF THE INVENTION

Problems to be Solved by the Invention

Since such a gas fuel injection valve has a high fuel injection flow rate compared with a liquid fuel injection valve, the operating stroke of the valve plunger is also large, and the valve-closing impact is therefore also large. Because of this, in such a conventional gas fuel injection valve, a semicircular cross-section annular lip, which is seated on a valve seat, is formed on a rubber seating member that is joined to a flat front end face of a valve plunger, and this annular lip ensures the valve-closing properties of the valve plunger and mitigates the valve-closing impact.

If the height of the annular lip is too large, when the annular lip is seated on the valve seat, the amount of compressive deformation becomes excessive, thus inducing bouncing of the valve plunger, the valve-closing properties are unexpectedly impaired, and the fuel injection flow rate characteristics might become unstable. Furthermore, the initial plastic deformation (collapse) of the annular lip becomes large, this increases the contact area between the annular lip and the valve seat to thus cause the annular lip to stick to the valve seat, thereby inhibiting the valve-opening responsiveness and, moreover, due to an increase in the degree of opening when the valve plunger opens the valve, an unnecessary increase in the fuel injection volume might occur. In order to avoid such problems, it is necessary to decrease the height of the annular lip, but when it becomes too small the function of the annular lip in mitigating the valve-closing impact of the valve plunger is degraded.

The present invention has been accomplished in light of such circumstances, and it is an object thereof to provide a gas fuel injection valve in which the height of an annular lip of a seating member is minimized, thus preventing bouncing of a valve plunger, initial plastic deformation (collapse) of the annular lip, sticking of the annular lip to a valve seat, etc., and in which, while aiming to stabilize the fuel injection volume characteristics, the function of the annular lip in mitigating the valve-closing impact of the valve plunger is able to be exhibited well.

Means for Solving the Problems

In order to attain the above object, according to a first aspect of the present invention, there is provided a gas fuel injection valve comprising a valve body that has a nozzle member having a valve seat and a nozzle hole extending through a central part of the valve seat, a tubular valve housing formed from a magnetic material and connectedly provided at a rear end of the nozzle member, and a fixed core disposed rearwardly of the valve housing, a valve plunger that is slidably fitted to a sliding guide face on an inner periphery of the valve housing and has joined to a front end thereof a rubber seating member that is seated on the valve seat so as to close the nozzle hole, a return spring that is provided in a compressed state between the fixed core and the valve plunger and urges the valve plunger toward the valve seat side, and a coil that is disposed so as to surround the fixed core and, when energized, generates a magnetic force that attracts the valve plunger to the fixed core and separates the valve plunger from the valve seat, characterized in that a circular recess is formed in a front end face of the valve plunger, the circular recess being surrounded by an annular land part, which is an outer peripheral part of the front end face, an inner peripheral face of the circular recess is formed in a tapered shape so as to increase in diameter in going from a base of the circular recess toward the annular land part, an annular lip is formed on the seating member, the annular lip being joined from the inner peripheral face through to the annular land part and being seated on the valve seat, and the annular lip is disposed so as that an annular ridge line (R) of an apex of the annular lip is positioned, in a projection in the axial direction of the valve plunger, above the inner peripheral face.

Further, according to a second aspect of the present invention, in addition to the first aspect, a flat part is formed in the seating member, the flat part being integrally connected to an inner peripheral end of the annular lip and joined to the base.

Effects of the Invention

In accordance with the first aspect of the present invention, when the valve plunger is in a valve-closed state, the annular lip of the seating member is compressed by means of a reaction force from the valve seat, but since the annular lip has the annular ridge line at its apex positioned, in a projection in the axial direction of the valve plunger, above the taper-shaped inner peripheral face of the circular recess of the valve plunger, the annular lip receives not only a compressive load in the axial direction but also a compressive load in a diameter-reducing direction along the taper-shaped inner peripheral face, and the annular lip is compressively deformed in the two directions. Therefore, in spite of the height of the annular lip from the annular land part of the valve plunger being set to be sufficiently small, the valve-closing impact of the valve plunger can be mitigated effectively by means of compressive deformation of the annular lip in the two directions. Furthermore, since it is possible to set the height of the annular lip to be sufficiently small in this way, it becomes possible to prevent bouncing of the valve plunger, initial plastic deformation (collapse) of the annular lip, sticking of the annular lip to the valve seat, etc., thus stabilizing the fuel injection volume characteristics.

In accordance with the second aspect of the present invention, when the annular lip is compressively deformed in the diameter-reducing direction, the deformation is transmitted to the flat part, which is joined to the base of the circular recess of the valve plunger, and since the flat part resists compressive deformation of the annular lip in the diameter-reducing direction, it is possible to prevent excessive compressive deformation of the annular lip in the diameter-reducing direction.

EXPLANATION OF REFERENCE NUMERALS AND SYMBOLS

Figure 1:
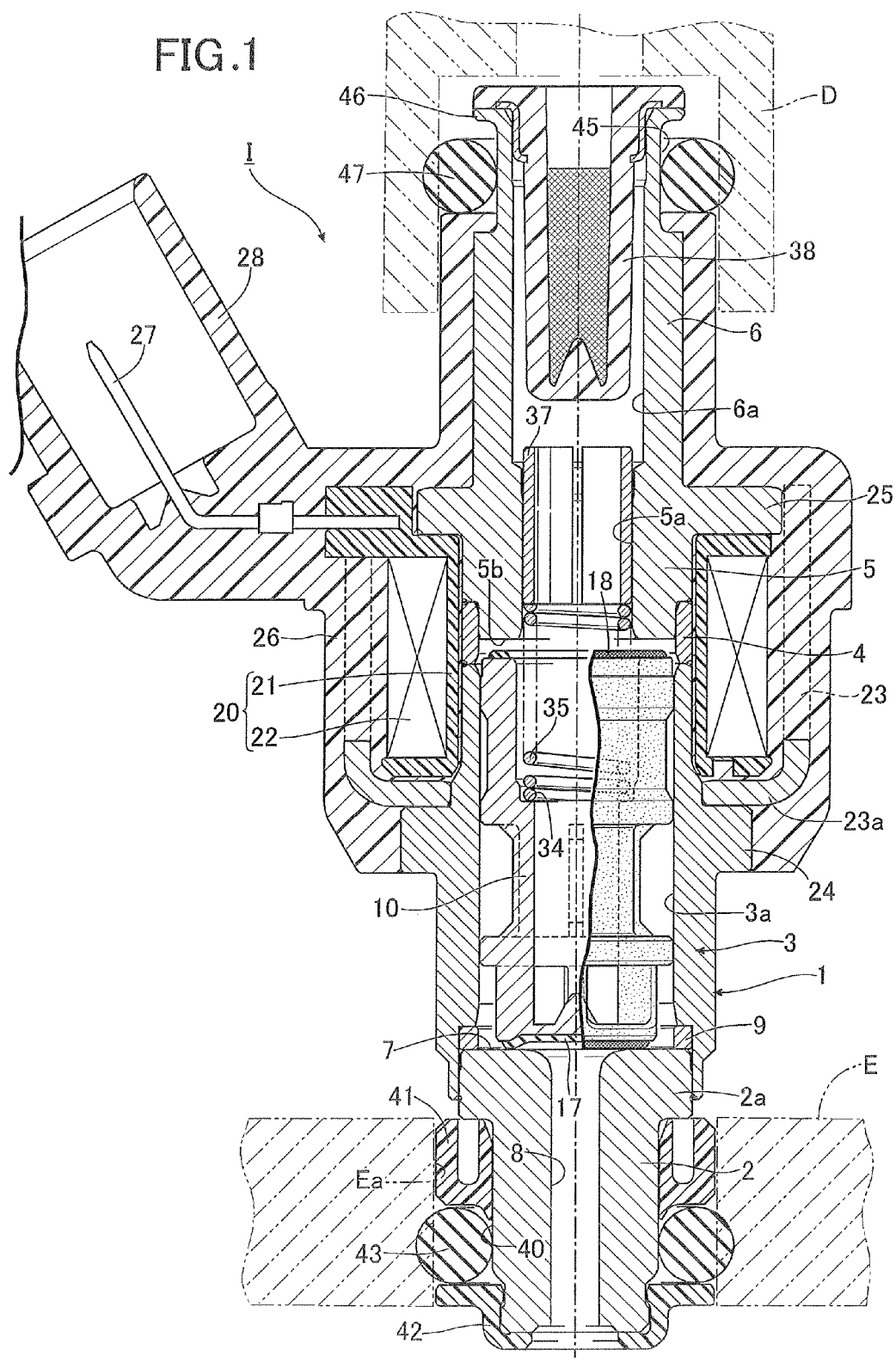
FIG. 1 is a vertical sectional view of a gas fuel injection valve related to the present invention. (first embodiment)

I Gas fuel injection valve
R Ridge line
1 Valve body
2 Nozzle member
3 Valve housing
5 Fixed core
7 Valve seat
8 Nozzle hole
10 Valve plunger
14c Annular groove
17 Seating member
22 Coil
34 Spring seat
35 Return spring
50 Annular land part
51 Circular recess
51a Base
51b Inner peripheral face
52 Flat part
53 Annular lip

MODE FOR CARRYING OUT THE INVENTION

A mode for carrying out the present invention is explained below by reference to the attached drawings. Throughout the present specification, relative positional terms like 'upper', 'lower', 'front', 'rear', 'top', 'bottom', 'horizontal', 'vertical', and the like are used to refer to the orientation of the apparatus as shown in the drawings. These terms are used in an illustrative sense to describe the depicted embodiments, and are not meant to be limitative. It will be understood that the depicted apparatus may be placed at an orientation different from that shown in the drawings, such as inverted 180 degrees or transverse to that shown, and in such a case, the above-identified relative positional terms will no longer be accurate.

Embodiment 1

Figure 2:
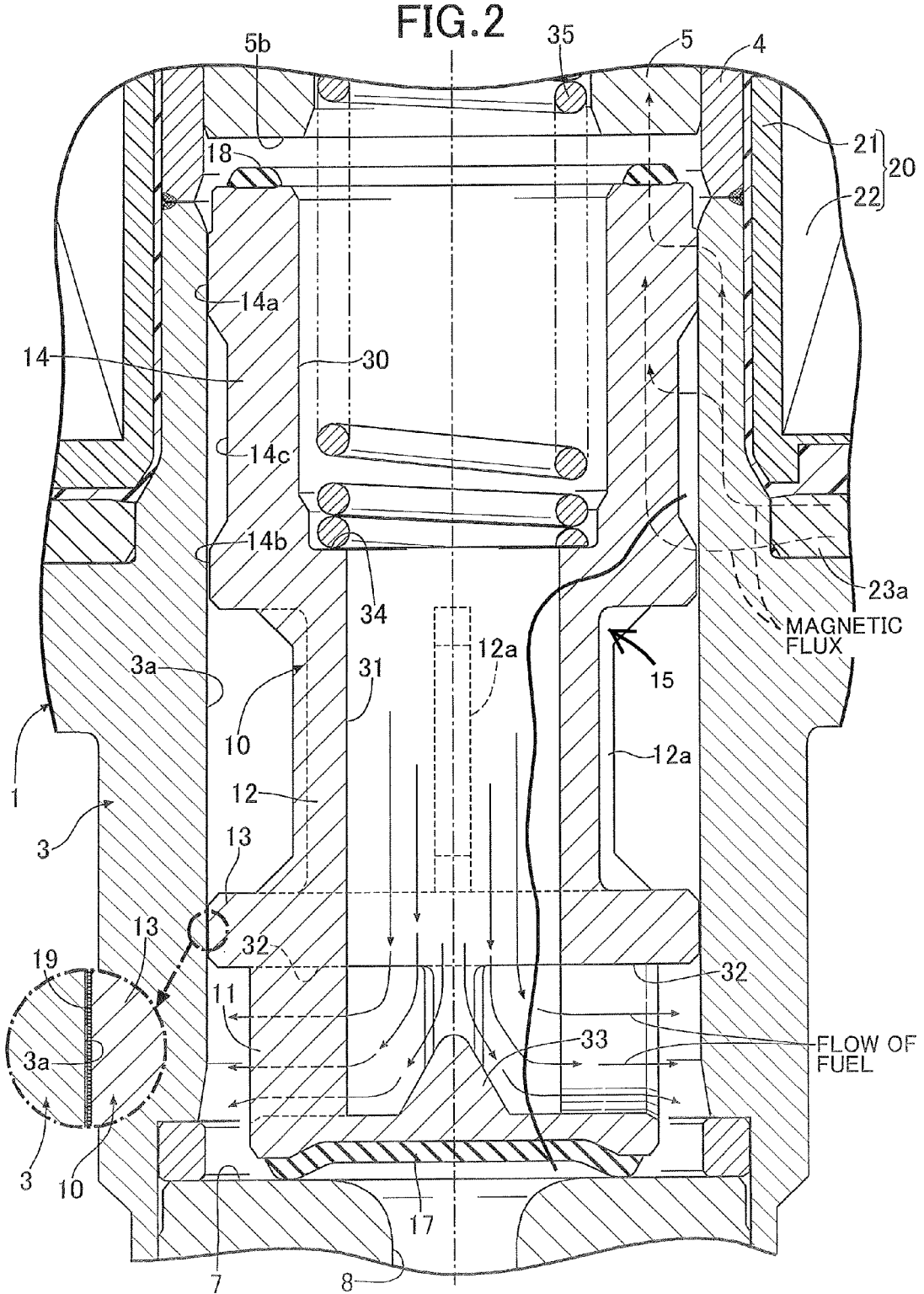
FIG. 2 is an enlarged view of an area around a valve plunger of FIG. 1. (first embodiment)

First, in FIG. 1 and FIG. 2, a gas fuel injection valve I related to the present invention has its front end part fitted into a mounting hole Ea provided in a tube wall of an intake tube E of an engine, and injects gas fuel into the interior of the intake tube E during an engine intake stroke. A valve body 1 of this injection valve I is formed from a cylindrical nozzle member 2, a hollow cylindrical valve housing 3 that is made from a magnetic material and has its front end part fitted onto and bonded by welding to an outer peripheral face of a flange portion 2a at the rear end of the nozzle member 2, a hollow cylindrical fixed core 5 that is connectedly provided integrally with the rear end of the valve housing 3 via a non-magnetic cylindrical body 4, and a hollow cylindrical fuel inlet tube 6 that is connectedly provided integrally with the rear end of the fixed core 5. The fixed core 5 is formed so that its internal diameter is smaller than the internal diameter of the valve housing 3, and an attracting face 5b at the front end opposes a valve plunger 10, which is described later, of the valve housing 3.

The nozzle member 2 has a flat valve seat 7 that faces the interior of the valve housing 3 and a nozzle hole 8 that extends through a central part of the valve seat 7 and opens on a front end face of the nozzle member 2, and an annular shim 9 for adjusting the position of the valve seat 7 is disposed between the nozzle member 2 and the valve housing 3.

An inner peripheral face of the valve housing 3 forms a sliding guide face 3a, and the valve plunger 10, which is primarily made up of a plunger body 15 formed from a magnetic material, is slidably fitted to the sliding guide face 3a.

The plunger body 15 of this valve plunger 10 is formed by coaxially and integrally connecting in sequence from the front end side a short shaft part 11, a first journal part 13 that has a larger diameter than that of the short shaft part 11 and is slidably fitted to the sliding guide face 3a, a long shaft part 12 that has a smaller diameter and is longer than the short shaft part 11, and a second journal part 14 that has a larger diameter than that of the short shaft part 11 and is slidably fitted to the sliding guide face 3a. The valve plunger 10 also includes a rubber seating member 17 attached to a first end of the plunger body 15, and that can be seated on the valve seat 7. The rubber seating member 17 is joined to the plunger body 15 by baking to a front end face of the short shaft part 11.

Figure 3:
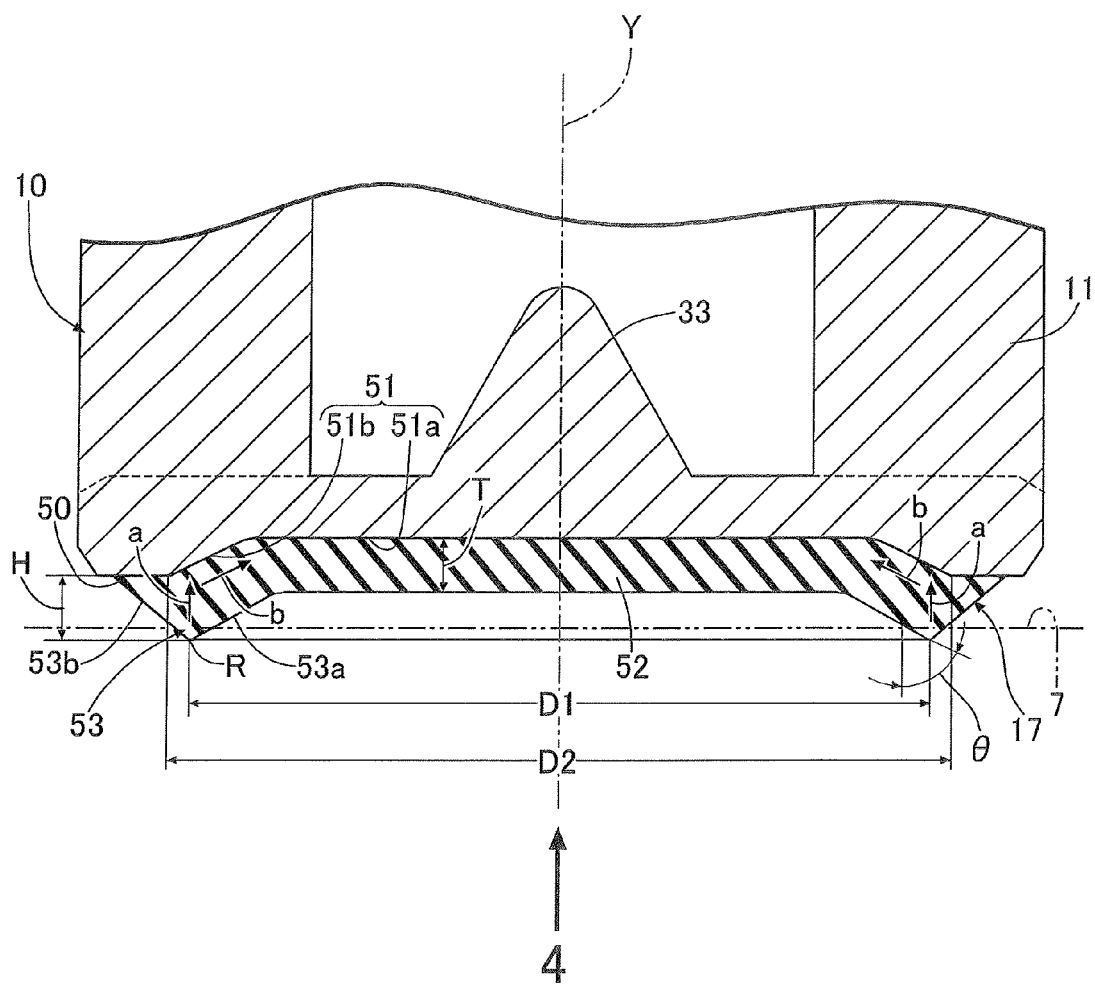
FIG. 3 is an enlarged view of an area around a seating member of FIG. 2. (first embodiment)
Figure 4:
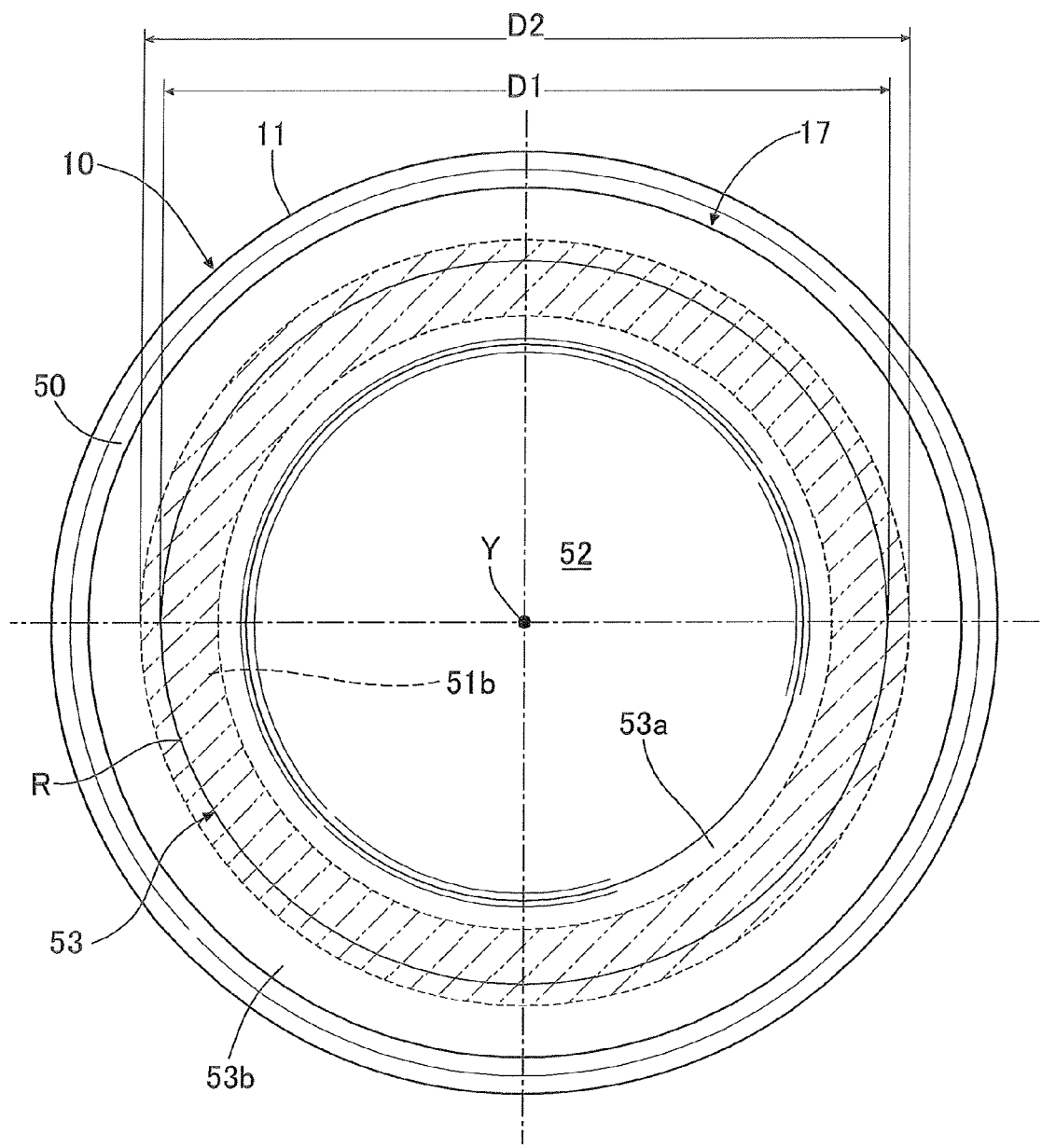
FIG. 4 is a view from arrow 4 in FIG. 3. (first embodiment)

As shown in FIG. 2 and FIG. 3, a circular recess 51 is formed in the front end face of the short shaft part 11, that is, a front end face of the valve plunger 10, the circular recess 51 being surrounded by an annular land part 50, which is an outer peripheral part thereof. This circular recess 51 is defined by a flat base 51a that is perpendicular to an axis Y of the valve plunger 10 and an inner peripheral face 51b that is in a tapered shape that increases in diameter from the base 51a in going toward the annular land part 50. The seating member 17 is joined from the annular land part 50 through to the base 51a.

The seating member 17 is formed from a circular flat part 52 that is joined to the base 51a and has a constant thickness and an annular lip 53 that is integrally connected to the outer periphery of the flat part 52 and joined from the inner peripheral face 51b through to the annular land part 50, and the annular lip 53 is formed into a shape with a substantially triangular cross-section having an inner periphery side inclined face 53a, substantially parallel to the inner peripheral face 51b, descending from its annular apex toward the flat part 52 and an outer periphery side inclined face 53b descending from the apex toward the annular land part 50. Moreover, the annular lip 53 is formed so that an annular ridge line R at its apex in particular is positioned, in a projection in the axial direction of the valve plunger 10, above the taper-shaped inner peripheral face 51b. A diameter D1 of the annular ridge line R is therefore smaller than a diameter D2, on the large diameter side, of the taper-shaped inner peripheral face 51b. Furthermore, a height H of the annular lip 53 from the annular land part 50 is set to be approximately half the height of an annular lip of a conventional seating member. Specifically, if the height of an annular lip of a conventional seating member is 0.8 mm, the height H of the annular lip 53 of the present invention from the annular land part 50 is set to be 0.4 mm. The height H of the annular lip 53 is set to be substantially equal to a thickness T of the flat part 52 of the seating member 17. Furthermore, an angle O formed by the inner periphery side inclined face 53a relative to the axis Y of the valve plunger 10 is desirably set to be approximately 65°.

Referring again to FIG. 1 and FIG. 2, an annular cushion member 18 is joined by baking to a rear end face of the second journal part 14, that is, a rear end face of the valve plunger 10, the cushion member 18 being made of rubber and opposing the attracting face 5b of the fixed core 5. Set between opposing faces of this cushion member 18 and the fixed core 5 is a predetermined gap corresponding to valve-opening stroke of the valve plunger 10 when seated on the valve seat 7 of the seating member 17.

The second journal part 14 is formed so that the width in the axial direction is larger than the width in the axial direction of the first journal part 13, and an outer peripheral face of the second journal part 14 is formed from a first sliding surface 14a that is slidably fitted to the sliding guide face 3a of the valve housing 3 on the fixed core 5 side, a second sliding surface 14b that is slidably fitted to the sliding guide face 3a on the long shaft part 12 side, and an annular groove 14c that separates the first and second sliding surfaces 14a and 14b. In this arrangement, the annular groove 14c is formed so that the diameter of the bottom of the groove is sufficiently larger than the external diameter of the long shaft part 12. An outer peripheral face of the valve plunger 10 is coated with a film 19 made of a fluorine resin.

A coil assembly 20 is disposed from a region of the valve housing 3 into which the second journal part 14 is fitted through to the fixed core 5 so as to surround them. This coil assembly 20 is formed from a bobbin 21 that is fitted onto the outer peripheries of the valve housing 3, the non-magnetic cylindrical body 4, and the fixed core 5 and a coil 22 that is wound around the outer periphery of the bobbin 21, and a coil housing 23 made of a magnetic material is disposed on the outer periphery of the coil assembly 20 so as to cover it. This coil housing 23 has at the front end an end wall 23a that is fitted around the outer periphery of the valve housing 3 while receiving a front end face of the coil assembly 20, a front yoke flange 24 abutting against a front face of the end wall 23a is projectingly provided integrally with an outer peripheral face of the valve housing 3, and a rear yoke flange 25 fitted into an inner peripheral face of a rear end part of the coil housing 23 while abutting against a rear end face of the coil assembly 20 is projectingly provided integrally with an outer peripheral face of the fixed core 5. In this way, the coil assembly 20 and the coil housing 23 are mounted on the valve body 1. A resin molding layer 26 is formed so as to continuously cover outer peripheral faces of the front yoke flange 24, the coil housing 23, and the fuel inlet tube 6, and a coupler 28 is integrally molded with the resin molding layer 26 so as to project toward one side thereof, the coupler 28 retaining an energization terminal 27 connected to the coil 22.

The valve plunger 10 is provided with a large diameter lengthwise hole 30 that starts from the rear end face thereof and ends just before the front end face of the first journal part 13, a small diameter lengthwise hole 31 that starts from the bottom of the large diameter lengthwise hole 30 and ends just before the front end face of the short shaft part 11, and a plurality of sideways holes 32 that open the small diameter lengthwise hole 31 to the outer peripheral face of the short shaft part 11, and a conical flow aligning projection 33 is formed as an integral part of the plunger body 15. This flow aligning projection 33 defines an upwardly-extending interior portion of the short shaft part 11, as shown, and is situated on a bottom central part of the small diameter lengthwise hole 31, the flow aligning projection 33 inducing gas fuel to flow separately to the plurality of sideways holes 32 from the small diameter lengthwise hole 31. A plurality of axially extending reinforcing ribs 12a are formed on the outer peripheral face of the long shaft part 12.

The large diameter lengthwise hole 30 communicates with a hollow portion 5a of the fixed core 5, and a rear-facing annular step formed between the large diameter lengthwise hole 30 and the small diameter lengthwise hole 31 serves as a spring seat 34. The spring seat 34 is thus disposed forward of the first sliding surface 14a.

On the other hand, a hollow retainer 37 is fitted into an inner peripheral face of the hollow portion 5a of the fixed core 5, the retainer 37 being a spring pin that supports, between itself and the spring seat 34, a return spring 35 urging the valve plunger 10 toward the valve seat 7 side, and a fuel filter 38 is fitted into an inlet of a hollow portion 6a of the fuel inlet tube 6, the hollow portion 6a being connected to the hollow portion 5a of the fixed core 5.

A pair of front and rear synthetic resin ring members 41 and 42 defining an annular front seal groove 40 are attached by fitting onto the outer periphery of the nozzle member 2, and a front O ring 43 is fitted into the front seal groove 40, the front O ring 43 coming into intimate contact with the inner peripheral face of the mounting hole Ea of the engine intake tube E when the nozzle member 2 is inserted into the mounting hole Ea.

Furthermore, an annular rear seal groove 45 is defined on the outer periphery of a rear end part of the fuel inlet tube 6 by a flange 46 formed at the rear end of the fuel inlet tube 6 and a rear end face of the resin molding layer 26, and a rear O ring 47 is fitted into the rear seal groove 45, the rear O ring 47 coming into intimate contact with an inner peripheral face of a fuel distribution pipe D when it is fitted around the outer periphery of the fuel inlet tube 6.

The operation of this embodiment is now explained.

When the coil 22 is in a de-energized state, the valve plunger 10 is pressed forward by virtue of the urging force of the return spring 35 to thus seat the seating member 17 on the valve seat 7. In this state, gas fuel fed from a gas fuel tank, which is not illustrated, to the fuel distribution pipe D flows into the fuel inlet tube 6, is filtered by the fuel filter 38, passes through the hollow retainer 37 and the large diameter lengthwise hole 30, the small diameter lengthwise hole 31, and the sideways holes 32 of the valve plunger 10, and is held in readiness within the valve housing 3.

In this process, the set load of the return spring 35 and the pressure of the gas fuel act on the valve plunger 10 as a valve-closing force, thus pressing the seating member 17 in a direction in which it is seated on the valve seat 7. The annular lip 53 of the seating member 17 is compressed by means of a reaction force from the valve seat 7, but since the annular lip 53 has a substantially triangular cross-section and the annular ridge line R at its apex is positioned, in a projection in the axial direction of the valve plunger 10, above the taper-shaped inner peripheral face 51b of the circular recess 51 of the valve plunger 10, the annular lip 53 receives not only a compressive load a in the axial direction but also a compressive load b in a diameter-reducing direction along the taper-shaped inner peripheral face 51b, and the annular lip 53 is compressively deformed in the two directions. Therefore, in spite of the height H of the annular lip 53 from the annular land part 50 of the valve plunger 10 being set to be approximately half the height of the conventional annular lip, the valve-closing impact of the valve plunger 10 can be mitigated effectively by means of compressive deformation of the annular lip 53 in the two directions. Furthermore, since it is possible to set the height H of the annular lip 53 to be sufficiently small in this way, it becomes possible to prevent bouncing of the valve plunger 10, initial plastic deformation (collapse) of the annular lip 53, sticking of the annular lip 53 to the valve seat 7, etc., thus stabilizing the fuel injection volume characteristics.

Furthermore, when the annular lip 53 is compressively deformed in the diameter-reducing direction b, the deformation is transmitted to the flat part 52, which is joined to the base 51a of the circular recess 51 of the valve plunger 10, and since the flat part 52 resists compressive deformation of the annular lip 53 in the diameter-reducing direction b, it is possible to prevent excessive compressive deformation of the annular lip 53 in the diameter-reducing direction b.

When the coil 22 is energized by passing current, a resultant magnetic flux runs in sequence through the coil housing 23, the valve housing 3, the second journal part 14, the fixed core 5, the rear yoke flange 25, and the coil housing 23; due to the magnetic force the valve plunger 10 is attracted to the fixed core 5 against the set load of the return spring 35, and the rubber cushion member 18 of the valve plunger 10 abuts against the front end face of the fixed core 5, thereby restricting the opening limit of the seating member 17 relative to the valve seat 7.

Since, as hereinbefore described, the second journal part 14 is formed so that the axial width is larger than the axial width of the first journal part 13, and the outer peripheral face of the second journal part 14 is formed from the first sliding surface 14a slidably fitted to the sliding guide face 3a of the valve housing 3 on the fixed core 5 side, the second sliding surface 14b slidably fitted to the sliding guide face 3a on the long shaft part 12 side, and the annular groove 14c separating the first and second sliding surfaces 14a and 14b, when the magnetic flux runs from the valve housing 3 to the second journal part 14, it is passed from the sliding guide face 3a of the valve housing 3 to the first and second sliding surfaces 14a and 14b of the second journal part 14, and since the groove bottom of the annular groove 14c separating the two sliding surfaces 14a and 14b is very shallow relative to the outer peripheral face of the long shaft part 12, and a very small gap is formed between itself and the sliding guide face 3a, the magnetic flux is also passed from the valve housing 3 to the second journal part 14 via this very small gap. In this way, it is possible to ensure a relatively large magnetic path area between the valve housing 3 and the second journal part 14, thus improving the valve-opening responsiveness of the valve plunger 10.

Moreover, in spite of the axial width of the second journal part 14 being larger than that of the first journal part 13, since the first and second sliding surfaces 14a and 14b of the second journal part 14, which are separated by the annular groove 14c, have a relatively small axial width, which is substantially the same as that of the first journal part 13, even if oil contaminating gas fuel introduced into the valve housing 3 enters and forms an oil film between the sliding guide face 3a and the first journal part 13 and the first and second sliding surfaces 14a and 14b, this oil film is easily sheared by virtue of the valve-opening force due to the magnetic force of the valve plunger 10, thus eliminating sticking of the valve plunger 10 to the sliding guide face 3a. Furthermore, the fluorine resin film 19 formed by coating on the outer peripheral face of the valve plunger 10 promotes shearing of the oil film.

In this way, the second journal part 14 can satisfy the contradictory requirements of ensuring a necessary magnetic path area and preventing sticking due to an oil film, thereby improving the valve-opening responsiveness of the valve plunger 10.

Furthermore, the valve plunger 10 can always maintain a stable attitude by sliding of the first journal part 13 and the first and second sliding surfaces 14a and 14b of the second journal part 14 relative to the sliding guide face 3a of the valve housing 3 during valve opening and valve closing.

The present invention is not limited to the above-mentioned embodiment and may be modified in a variety of ways as long as the modifications do not depart from the spirit and scope thereof.

The invention claimed is:

1. A gas fuel injection valve comprising:
a valve body that has a nozzle member having a valve seat and a nozzle hole extending through a central part of the valve seat, a tubular valve housing formed from a magnetic material and connectedly provided at a rear end of the nozzle member, and a fixed core disposed rearwardly of the valve housing, a valve plunger that is slidably fitted to a sliding guide face on an inner periphery of the valve housing and has joined to a front end thereof a rubber seating member that is seated on the valve seat so as to close the nozzle hole, a return spring that is provided in a compressed state between the fixed core and the valve plunger and urges the valve plunger toward the valve seat side, and
a coil that is disposed so as to surround the fixed core and, when energized, generates a magnetic force that attracts the valve plunger to the fixed core and separates the valve plunger from the valve seat, wherein:
a circular recess is formed in a front end face of the valve plunger, the circular recess comprising abase portion and an inner peripheral face and being surrounded by an annular land part, which is an outer peripheral part of the front end face, the an inner peripheral face of the circular recess formed in a tapered shape so as to increase in diameter in going from the a base portion of the circular recess toward the annular land part,
an annular lip is formed on the seating member, the annular lip being joined from the inner peripheral face through to the annular land part and being seated on the valve seat, the annular lip including an inner periphery inclined face and an outer periphery inclined face, said inner and outer periphery inclined faces meeting at an apex which defines a substantially pointed portion, and the annular lip is configured so that the apex extends annularly around a longitudinal axis of the valve body to define an annular ridge line as viewed in a direction of said longitudinal axis, and the apex is positioned radially inwardly of a radial outer edge of the inner peripheral face.

2. The gas fuel injection valve according to claim 1, wherein a flat part is formed in the seating member, the flat part being integrally connected to an inner peripheral end of the annular lip and joined to the base.

3. The gas fuel injection valve according to claim 1, wherein when a diameter of the annular ridge line of the apex of the annular lip is set to be D1, and a diameter on a radially outer side of the inner peripheral face of the circular recess is set to be D2, D1 is smaller than D2.

4. The gas fuel injection valve according to claim 1, wherein the annular lip defines a substantially pointed shape on each side thereof with the tip of the annular lip forming the apex as seen in cross section, and wherein a diameter of the annular lip at the apex is less than a maximum diameter of the circular recess, whereby contact between the seating member and the valve seat caused by movement of the plunger against the valve seat compressively deforms the annular lip of the seating member in an inward diameter-reducing direction as well as in an axial direction of the plunger.

5. The gas fuel injection valve of claim 1, wherein said base portion of the circular recess is substantially flat.

\* \* \* \* \*